US012667817B1

(12) United States Patent
Van Volkinburg

(10) Patent No.: US 12,667,817 B1
(45) Date of Patent: Jun. 30, 2026

(54) NANOBUBBLE GENERATION DEVICE

(71) Applicant: Jonathan James Van Volkinburg, Clovis, CA (US)

(72) Inventor: Jonathan James Van Volkinburg, Clovis, CA (US)

( * ) Notice: Subject to any disclaimer, the term of this patent is extended or adjusted under 35 U.S.C. 154(b) by 273 days.

(21) Appl. No.: 18/634,883

(22) Filed: Apr. 12, 2024

Related U.S. Application Data

(60) Provisional application No. 63/458,902, filed on Apr. 12, 2023.

(51) Int. Cl.
*B01F 25/43* (2022.01)
*B01F 23/23* (2022.01)
*B01F 23/2375* (2022.01)
*B01F 25/431* (2022.01)

(52) U.S. Cl.
CPC .... *B01F 25/43163* (2022.01); *B01F 23/2366* (2022.01); *B01F 23/2375* (2022.01)

(58) Field of Classification Search
CPC ........................ B01F 25/43163; B01F 23/2375
See application file for complete search history.

(56) References Cited

U.S. PATENT DOCUMENTS 10,814,290 B2 * 10/2020 Bauer ........................ C02F 1/48

FOREIGN PATENT DOCUMENTS

CN 208599508 U * 3/2019
KR 20180018004 A * 2/2018 .......... B01F 3/04262

* cited by examiner

*Primary Examiner* — Robert A Hopkins
(74) *Attorney, Agent, or Firm* — Richard A. Ryan

(57) ABSTRACT

A nanobubble generation device configured to receive an incoming fluid stream having an entrained gas and to discharge an outgoing fluid stream having entrained nanobubbles. The device has a housing enclosing an internal assembly with a leading plate assembly and a trailing plate assembly. Each plate assembly has at least one gasket and a plurality of perforated plates that optimize flow regimes to enhance the formation, mixing, and shearing of bubbles into nanobubbles in order to produce an outgoing fluid stream having entrained nanobubbles. The perforated plates are coaxially supported by the shaft with the perforations of adjacent plates being in offset relation to each other to restrict fluid flow and create a turbulent mixing zone in the housing. The internal assembly is held in place in the housing by the expansion of the gaskets due to a compression force applied to the plate assemblies.

4 Claims, 11 Drawing Sheets

NANOBUBBLE GENERATION DEVICE

CROSS-REFERENCE TO RELATED APPLICATIONS

This patent application claims priority to U.S. Provisional Patent Application Ser. No. 63/458,902 filed Apr. 12, 2023.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The present invention relates generally to apparatuses and methods for processing water so as to improve the quality thereof. In particular, the present invention relates to such apparatuses and methods that comprise devices for producing nanobubbles in a stream of fluid, such as water, by passing the stream of water through a nanobubble generation device. Even more particularly, the present invention relates to nanobubble generation devices that are utilized to convert an incoming steam of fluid having an entrained gas into an outgoing stream of fluid having entrained nanobubbles.

B. Background

As is generally well known, water treatment process, use of water softeners and/or water filtration, is commonly applied to applications where water quality is of importance. Whole house usage, swimming pools, spas, fountains, ponds, water treatment facilities, irrigation applications, and the like all use water filtration, with and without water softeners and/or other chemical treatment, to help remove a variety of contaminants and impurities. The general objective of such water treatment processes is to adjust the quality of the water to a level of relative purity, which is the level of being free of foreign and unwanted substances, that is required or desired for a particular application. Such contaminants and impurities often include, but are not limited to, organics (such as dyes, phenols, surfactants, pesticides and the like), microorganisms (viruses and bacteria), and inorganics (including magnesium, sodium, calcium, potassium, chlorides, nitrates and the like). Water softeners and water filtration systems are generally designed and configured to target these contaminants and impurities by category or classification of the contaminant or impurity.

Persons who are skilled in the relevant art, readily understand and widely accept that softeners and filters need to be cleaned, recharged, changed, or otherwise serviced on a regular basis in order to maintain a desired specific level of performance. Limitations of the softener and/or filter to trap or treat specific and known contaminants are understood and regularly evaluated at great lengths to ensure the defined performance criteria of the systems are being met. As also well known, performance of an individual system may suffer as the predicted service date approaches, resulting in poor or undesired water quality. Additionally, only the water which passes through the conditioner is directly impacted by the operation of the conditioner. Downstream pipes, tubes, and systems are not affected in any way other than what is expressed by exposure to water of greater purity passing therethrough. As a result of this, lines and systems that may have been previously contaminated by contaminated water passing therethrough are likely to remain contaminated unless they are otherwise cleaned or treated with a chemical or disinfectant where the contamination is located.

Nanobubbles, which are gas bubbles of sizes less than approximately one micrometer in size, have been shown to improve and enhance water treatment processes due to their natural ability to continuously remain in motion and remain in suspension in water, as opposed to larger bubbles which float out of suspension and rupture. In addition, relative to larger bubbles, nanobubbles are naturally well distributed throughout the liquid, are negatively charged and significantly increase the surface area and surface tension effect. Due to these features, nanobubbles improve the efficacy of certain chemicals which are added to the water, help keep filters free from fouling and clogging, and scour downstream piping and systems, thereby preventing the accumulation of and removing scale and biofilm from the sides of such piping and systems. Nanobubbles that are produced from oxygen, carbon dioxide, ozone, and hydrogen impart additional properties to the water, which properties are beneficial to specific applications.

Nanobubbles are formed by the use of nanobubble generators that are specially configured to form and entrain nanobubbles in water or other liquids. In general, nanobubble generators are devices in which a gas is mixed into a supply liquid, such as water, in a manner in which the gas is then acted upon to convert the gas into nanobubbles throughout the liquid. The process of converting the supply water into water containing nanobubbles is performed through a process of separating and compressing the supply water (which is mixed with water and air) while passing through a pipe or other device of the generating means to form the nanobubbles. Typically, this involves passing the water that enters the generator through one or more chambers that are configured to create vortices and pressure drops that convert the entrained gases in the water into nanobubbles in the water. Prior art nanobubble generators use a variety of process, machines, devices and configurations to generate nanobubbles. As well known, many of these generators have limitations with regard to their ability to form effectively form nanobubbles and/or they require initial and/or operating costs that are likely to be prohibitive for many desired uses of nanobubbles. What is needed, therefore, is an economically available device that effectively and efficiently provides for the formation and entrainment of nanobubbles within a water delivery or water recirculation system so as to be advantageous to the overall water treatment process.

SUMMARY OF THE INVENTION

The following presents a simplified summary of the disclosure of the present invention in order to provide a basic understanding of the invention to the reader. As such, this Summary is not an extensive overview of the disclosure and it does not identify key/critical elements of the invention or delineate the scope of the invention. The sole purpose of this Summary is to present some concepts disclosed herein in a simplified form as a prelude to the more detailed description that is presented later.

The use of terms such as "including", "comprising" or "having" and variations thereof herein is meant to encompass the items listed thereafter and equivalents thereof. The terms "a" and "an" herein do not denote a limitation of quantity, but rather denote the presence of at least one of the referenced items. Further, the use of terms "first", "second", and "third", and the like, herein do not denote any order, quantity, or importance, but rather are used to distinguish one element or feature of an element from another. The term "and/or," when used herein with a list of two or more items, means that any one of the listed items can be employed by itself, or any combination of two or more of the listed items can be employed.

The nanobubble generation device of the present invention provides the benefits and solves the problems identified above. That is to say, the present invention is directed to a new nanobubble generation device that is structured and arranged to effectively and efficiently convert water having an entrained gas into water having nanobubbles. Specifically, the present invention is a nanobubble generation device that utilizes the principles of cavitation, mixing, and shearing to produce and entrain microscopic bubbles within a fluid stream, such as a stream of water having entrained gas. Even more specifically, the nanobubble generation device of the present invention is structured and arranged to optimize flow regimes at different points within the device to effectively and efficiently enhance the formation, mixing, and shearing of bubbles into nanobubbles, thereby converting a fluid stream having entrained gas into a fluid stream having nanobubbles.

In one embodiment, the nanobubble generation device of the present invention comprises a housing into which a series of perforated plates, coaxially supported by a shaft or rod, are positioned. The size of the housing is dependent on the internal assembly and dictates the diameter and size of the internal plates, which are sized according to the flow rate of the fluid that will pass through the new nanobubble generation device. The housing has an inlet, which quickly expands in size and taking the form of a reducer (conical or bell), flange, or bushing, thereby permitting for the expansion to be immediate and perpendicular to the pipe at the entry of the fluid flow. A gas addition port or venturi injector may be applied at this point, or prior to this point, to introduce the gases which are to be converted to macro, micro, and nanobubbles. The sudden expansion into the housing acts to slow the linear velocity of the liquid. This flow is then restricted by a leading plate assembly (e.g., a flow restricting assembly) having an inlet gasket or gaskets. By restricting the flow downstream while expanding the line diameter a turbulent mixing zone is created within the housing. As the fluid is channeled through the flow restricting leading plate assembly, velocity is increased and a pressure drop is experienced. The pressure drop allows for the dissolved gases (e.g., air, oxygen, or otherwise as may be utilized) to be released out of the liquid and form into macro, micro, and nanobubbles. The degree to which the flow is restricted by the flow restricting assembly impacts both the pressure drop across the gasket(s) as well as the quantity and size of the resulting entrained gas within the liquid flowing downstream of the pressure drop. Since an increase in differential pressure requires an increase in energy, the open area of the gaskets and plates are determined by the benefit achieved by having more entrained gases in comparison with the cost required to achieve the necessary pressure drop.

The leading plate assembly has the inlet gaskets and a series of separated shearing and mixing plates, which are incrementally spaced from one another and coaxially supported by a shaft. The edges of the perforations or apertures of the shear plates supply a cutting edge which aid in reducing macrobubbles and microbubbles into nanobubbles as the fluid passes through the new macrobubble generation device. Additionally, the shearing plates act to direct flow into a "torturous" or "snaking" path, which path serves two purposes. First, directing the fluid flow into this path ensures that the bubbles formed in the cavitation zone are most likely to encounter the cutting edges of the shear plates. Second, the directing action encourages vigorous mixing of the fluid so that bubble collision and collapse will occur, also assisting in the formation of nanobubbles. The shear plate portion of the leading plate assembly is comprised of at least three plates, however, no upper limit has been identified. In practicality, the limit on the number of shear plates is a decision which is based on marginal utility. Currently, all plates in the shear plate portion of the assembly are of the same aperture pattern, with the plates themselves being rotated axially in relation to one another to ensure the creation of the torturous path.

The final or trailing plate assembly comprises a flow restricting outlet gasket and two or more coaxially supported shearing plates. This flow restricting outlet gasket is of a different pattern than the inlet gasket of the leading plate assembly. This trailing plate assembly is utilized to supply back pressure to the entire generation device, setting systems linear velocity, and thus helping to produce the pressure drop across the arrangement of the inlet gaskets in the assembly. The trailing plate assembly also serves to channel the fluid flow out of the housing through the outlet.

As will be readily understood by persons who are skilled in the art, the new nanobubble generation device of the present invention comprises an internal assembly having multiple plates that are formed into at least two different plate assemblies, namely, the following: (1) a leading, pressure drop inducing first plate assembly having at least one inlet gasket and a plurality of identical or nearly identical shearing/mixing plates; (2) a trailing plate assembly having at least one outlet gasket and a series of shearing/mixing plates that controls line velocity and overall system pressure differential; and (3) a central support shaft or rod that runs the length of the internal assembly and on which are mounted, in an axially rotated pattern, the leading plate assembly and the trailing plate assembly.

As noted above, in a preferred embodiment of the new nanobubble generation device, all plates of the internal assembly are contained in a housing comprising an inlet expansion, a length of tube or pipe, and an outlet contraction, with or without a gas injection port or venturi injector. The gaskets and plates of the internal assembly are held in position by a centrally located hollow tube, pipe, or bar with threaded ends, which defines the central support shaft. In one of the embodiments, a smaller, separate bar is positioned through the gaskets and plates to function as a key mechanism. The spacing between each plate is determined by the placement of spacers/bushings between the plates and then compressed and held in place by the application of a set of nuts or other connectors on the threaded ends of the central shaft. Plate spacing may either be consistent or it may vary from plate to plate or segment to segment (sets of plates). For example, the plate set may consist of plate trios (or other quantity), where distance between the plate threesome is X distance while distance between plate sets is another distance Y. Plates may vary in aperture pattern from plate to plate or may have the same pattern but be clocked or rotated axially from the previous and subsequent plate in the series. Spacing between plates or plate-sets likewise may vary or be similar and consistent.

The leading and trailing flow directing plate assemblies in the current configuration comprises gaskets that are compressed between nuts or other connectors or between two shearing/mixing plates. The gaskets may be of the same aperture pattern as the shear plates. The gasket contains apertures to restrict flow as necessary for the inlet and outlet design requirements. When the plate assemblies are compressed, as a result of tightening of the end nuts or other connectors, the gaskets compress. This compression increases the outside diameter of the malleable gasket so it will be greater than the outside diameter of the plates. If the stack tightening (e.g., the compression of the plate assemblies) occurs after the plate assemblies are inserted into the housing, the gaskets will compress into the inner sidewall of the housing, thus assisting in holding the entire internal assembly stationary within the housing. The internal assembly is also supported downstream by a spring situated between the assembly compression nut and the outlet housing assembly, such as a connector, fitting or reducer. Force of the water/liquid in the line would have to be significant if it were to overcome the force supplied by the gasket compression against the internal wall of the housing and the spring tension in order to move the plate stack within the housing.

Accordingly, the primary object of the present invention is to provide a new nanobubble generation device that has the various advantages which are set forth above and that overcomes the various disadvantages and limitations which are associated with presently available nanobubble generation devices.

It is an important object of the present invention to provide a new nanobubble generation device that economically, effectively and efficiently forms and entrains nanobubbles as part of a process for treating water in a water delivery or water recirculation system so as to be advantageous to the overall water treatment process.

An important aspect of the present invention is that it provides a new nanobubble generation device which accomplishes the objectives set forth above and elsewhere in the present disclosure.

Another important aspect of the present invention is that it provides a new nanobubble generation device which can be easily and economically utilized as part of a water treatment or delivery system to effectively and efficiently generate nanobubbles and entrain the nanobubbles in a fluid stream so as to provide the benefits thereof, including improving the efficacy of certain chemicals that are added to the fluid stream, help keep filters free from fouling and clogging, and to scour downstream piping and systems, thereby preventing the accumulation of and removing scale and biofilm from the sides of such piping and systems.

Another important aspect of the present invention is that it provides a new nanobubble generation device which is structured and arranged to utilize the principles of cavitation, mixing, and shearing in order to produce and entrain nanobubbles within a fluid stream, such as a stream of water, having entrained gas.

Another important aspect of the present invention is that it provides a new nanobubble generation device which has a housing that encloses an internal assembly having a plurality of perforated plates that are structured and arranged to optimize flow regimes at different points within the new device to enhance the formation, mixing, and shearing of bubbles into nanobubbles, thereby converting a fluid stream having entrained gas into a fluid stream having nanobubbles.

Another important aspect of the present invention is that it provides a new nanobubble generation device having a housing into which multiple plate assemblies (each having multiple perforated plates) that are coaxially supported by a shaft or tube, with the housing having an expanded size inlet that acts to slow the linear velocity of the liquid and an outlet contraction, with a plate assembly located downstream of the inlet that restricts the flow to create a turbulent mixing zone in the housing.

Another important aspect of the present invention is that it provides a new nanobubble generation device having an internal assembly having multiple plates that are formed into a leading, pressure drop inducing first plate assembly, a plurality of identical or nearly identical shearing/mixing plates and a trailing plate assembly that controls line velocity and overall system pressure differential, with the plate assemblies being mounted on, typically in an axially rotated pattern, a central support shaft running the length of the internal assembly.

As will be explained in greater detail by reference to the attached figures and the description of the preferred embodiments which follow, the above and other objects and aspects are accomplished or provided by the present invention. As set forth herein and will be readily appreciated by persons who are skilled in the art, the present invention resides in the novel features of form, construction and mode of operation presently described and understood by the claims. The description of the invention which follows is presented for purposes of illustrating one or more of the preferred embodiments of the present invention and is not intended to be exhaustive or limiting of the invention. As will be readily appreciated by those persons who are skilled in the relevant art, the scope of the invention is only limited by the claims which follow after the discussion.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

Figure 1:
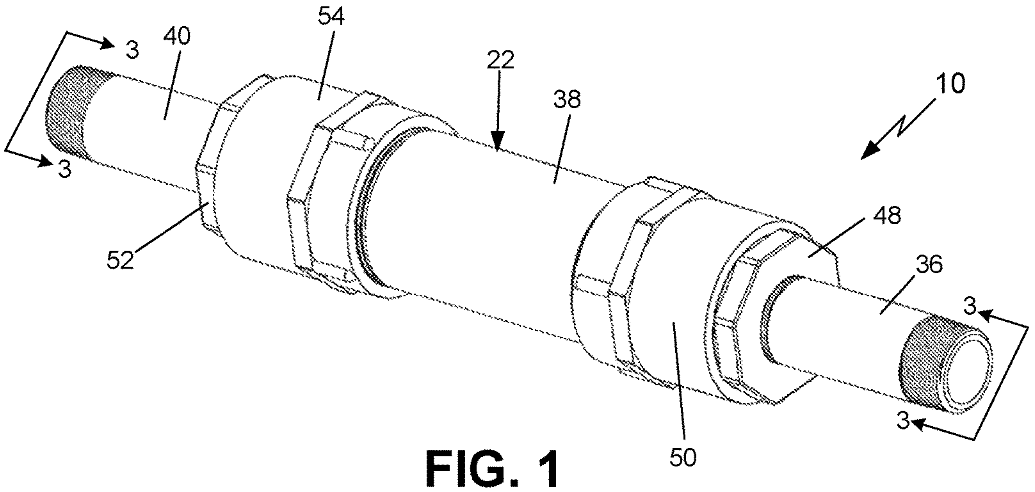
FIG. 1 is a left side perspective view of a nanobubble generation device that is configured according to a first embodiment of the present invention, with the inlet pipe shown to the right (the front end) and the outlet pipe shown to the left (the back end)
Figure 2:
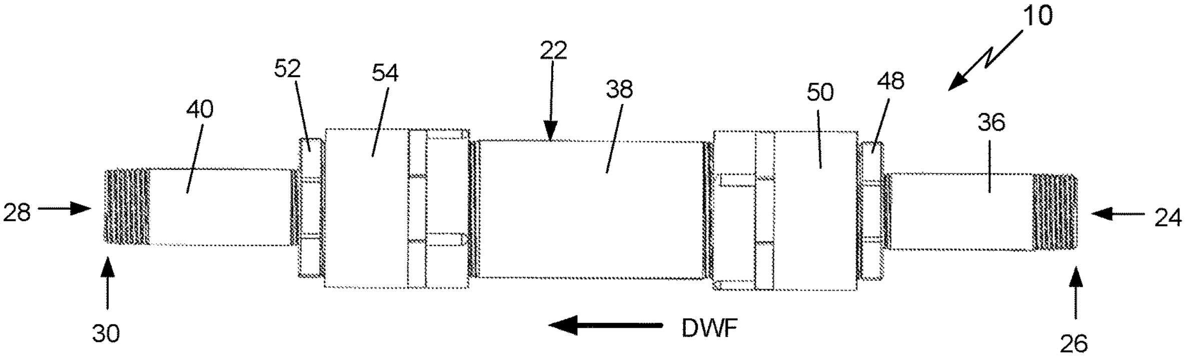
FIG. 2 is a left side view of the nanobubble generation device of FIG. 1.

With reference to the figures where like elements have been given like numerical designations to facilitate the reader's understanding of the present invention, the preferred embodiments of the present invention are set forth below. The enclosed figures are illustrative of several potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular configurations for the new nanobubble generation device of the present invention, as well as example ways in which the new composition may be utilized, persons who are skilled in the relevant art will readily appreciate that the present invention and the devices and situations in which the invention can be utilized are not so limited. For instance, the new nanobubble generation device comprise a variety of shear plate assemblies, shear plates and tubular member and systems with which the present invention can be utilized may be different. In addition, the exemplary embodiments of the present device are shown and described with only those components which are required to disclose the present invention. As such, many of the necessary components for manufacturing and using the present invention are not shown in the drawings or necessarily described below, but which are well known to persons who are skilled in the relevant art. As will be readily appreciated by such persons, the various elements of the present invention that are described below may take on any form consistent with forms which are readily realized by one of ordinary skill in the art having knowledge of prior art nanobubble generation devices and systems in which such devices are utilized.

A new nanobubble generation device that is configured pursuant to one or more embodiments of the present invention is referred to as 10 in FIGS. 1-3 and 7. A system for treating water to produce nanobubbles in the water using the new nanobubble generation device 10 that is configured pursuant a preferred embodiment of the present invention is shown as 12 in FIG. 16. As shown in these figures and which is set forth in more detail below, in the preferred embodiments, the new nanobubble generation device 10 (also referred to hereinafter as the "device 10) of the present invention is configured to be utilized as part of a water treatment system 12 for treating incoming water stream, shown as 14 in FIG. 16, in a water delivery or recirculation system so as to be advantageous to the overall water treatment process. More specifically, the new nanobubble generation device 10 of the present invention is structured and arranged to effectively and efficiently convert incoming water stream 14 having an entrained gas 16 into outgoing water stream 18 having nanobubbles 20, as shown with regard to the system 12 in FIG. 16. As set forth in more detail below, the device 10 utilizes the principles of cavitation, mixing, and shearing to produce and entrain microscopic bubbles (nanobubbles 20) within a fluid stream, such as an incoming water stream 14 having entrained gas 16 to convert the incoming water stream 14 into an outgoing water stream 18 having nanobubbles 20 entrained therein.

The new nanobubble generation device 10 of the present invention generally comprises a housing 22 having an inlet 24 at the first or right end 26 thereof and an outlet 28 at the second or left end 30, an internal water processor plate assembly 32 (hereinafter, the "internal assembly 30") in the housing 22 between the inlet 24 and outlet 28, and a conical compression spring 34, as best shown in FIGS. 1-7. As set forth in more detail below, during use of the new device 10, the incoming water stream 14 will flow into the inlet 24, engagedly contact the internal assembly 28 to produce convert the entrained gas 16 therein into nanobubbles 20, and the outgoing water stream 18 will flow out of the outlet 26 having the nanobubbles 20 entrained therein. The flow of the water through the new device 10 from the first end 26 to the second end 30 thereof is shown as the direction of water flow DWF in FIG. 2.

Figure 3:
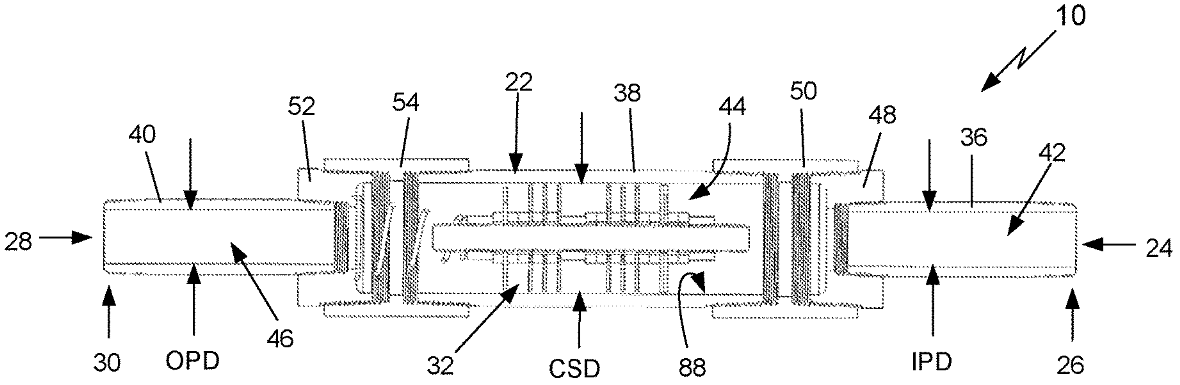
FIG. 3 is a cross-sectional left side view of the nanobubble generation device of FIG. 2 taken through lines 3-3 of FIG. 1.
Figure 4:
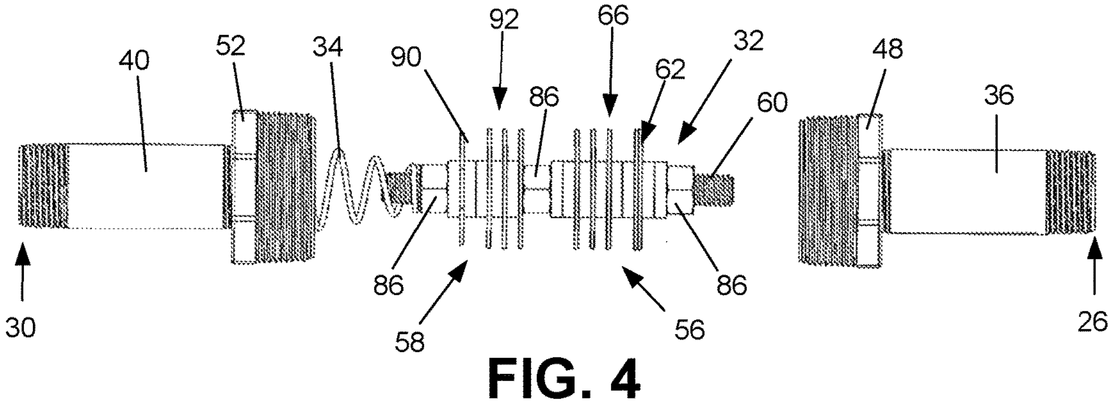
FIG. 4 is a left side view of the nanobubble generation device of FIG. 2 with the center section of the housing removed to show the internal assembly thereof.

The housing 22 is configured to be placed in-line with piping or tubing of a water treatment system 12 in which water or other fluid is flowing and facilitate the conversion of the entrained gas 16 in the incoming water stream 14 into the desired nanobubbles 20. To accomplish this, the housing 22 has an inlet pipe 36 having an inner inlet pipe diameter IPD, a center housing section 38 having an inner center section diameter CSD and an outlet pipe 40 having an outlet pipe diameter OPD, as shown in FIGS. 1-3 and 7. As shown in FIG. 3, the inlet pipe 36 defines an inlet pipe chamber 42, the center housing section 38 defines a center section chamber 44, and the outlet pipe 40 defines an outlet pipe chamber 46. As a result of the foregoing, the center section diameter CSD (and hence the center section chamber 44) of the new device 10 is greater than both the inlet pipe diameter IPD (and hence the inlet pipe chamber 42) and the outlet pipe diameter OPD (and hence the outlet pipe chamber 46) such that the flow of water through the device 10 enters the expanded center section chamber 44 when it flows from the inlet pipe 36 toward the center housing section 38 and enters the reduced diameter outlet pipe chamber 46 of the outlet pipe 40. In a preferred embodiment of the new device 10, the inlet pipe diameter 42 is the same as the outlet pipe diameter 46 and both are equal in diameter to the piping used in the connected water treatment system 12. To facilitate the connection between the inlet pipe 36 and center housing section 38, the embodiment of the new device 10 shown in the figures has an inlet transitional connector 48 and an inlet fitting 50 that connects the inlet pipe 36 to the center housing section 38. To facilitate the connection between the center housing section 38 and the outlet pipe 40, the embodiment of the new device 10 shown in the figures has an outlet transitional connector 52 and an outlet fitting 54 that connects the center housing section 38 to the outlet pipe 40. In the embodiment shown in the figures, each of these components are threadably connected. In certain embodiments, however, one or more of the above-described components can be integrally formed or fixedly connected to each other. For instance, the inlet pipe 36 can be integrally formed with or fixedly attached to the center housing section 38 or the center housing section 38 can be integrally formed with or fixedly attached to the outlet pipe 40. In other embodiments, the entire both the inlet pipe 36 and the outlet pipe 40 can be integrally formed with or fixedly attached to the center housing section 38 (i.e., the center housing section 38 can be a two-piece component). Various other combinations of integral and/or fixedly attached components are also possible.

The features of the housing 22 that are necessary for the device 10 of the present invention are that the housing 22 fits in the desired water treatment system 12, facilitates the flow of water from the inlet 24 to the outlet 28, encloses the internal assembly 32 in the center section chamber 44 such that the incoming water stream 14 must engage the internal assembly 32 to produce nanobubbles 20 that are entrained in the outgoing water stream 18, and provides the expansion as the incoming water stream 14 flows from the inlet pipe chamber 42 into the center section chamber 44 and contraction or reduction as the outgoing water stream 18 flows from the center section chamber 44 into the outlet pipe chamber 46. As will be readily understood by persons who are skilled in the art, the sudden expansion into the center housing section 38 acts to slow the linear velocity of the incoming water stream 14. This flow is then further restricted by the internal assembly 32. By restricting the flow downstream while expanding the line diameter (e.g., from the inlet pipe diameter IPD to the center section diameter CSD) a turbulent mixing zone is created within the center housing section 38. As the fluid is channeled through the internal assembly 32, the velocity of the fluid is increased and a pressure drop is experienced. The pressure drop allows for the dissolved gases of the entrained gas 16 (e.g., air, oxygen, or otherwise as may be utilized) to be released out of the incoming water stream 14 and form into macro, micro, and nanobubbles 20. The degree to which the flow is restricted by the flow restricting effect of the internal assembly 32, impacts the pressure drop across the internal assembly 32 as well as the quantity and size of the resulting entrained gas within the liquid downstream of the pressure drop. Since an increase in differential pressure requires an increase in energy, the open areas of certain components of the internal assembly 32 is determined by the benefit achieved by having more entrained gases in comparison with the cost required to achieve the necessary pressure drop. The housing 22 may be configured to incorporate a tee, port, or venturi injector to allow the introduction of additional gas to be processed through the device 10.

The internal assembly 32 of the device 10, which as set forth above, is positioned inside the center section chamber 44 of center housing section 30 and structured and arranged to be contacted by incoming water stream 14 to produce nanobubbles 20, generally comprises a leading plate assembly 56, a trailing plate assembly 58 and a threaded shaft or rod 60, as best shown in FIGS. 3-8, that supports the two plate assemblies 56/58 inside the center section chamber 44, as shown in FIG. 3. As described in more detail below, components of the leading plate assembly 56 and the trailing plate assembly 58 tightly abuttingly engage the inner sidewalls of the center housing section 38 to hold the internal assembly 32 in place inside the center section chamber 44 of the center housing section 38. The compression spring 34 between the trailing plate assembly 58 and the outlet 28, typically the outlet transitional connector 52 (as shown in FIG. 3) or the outlet fitting 54, further holds the internal assembly 32 in place in the center section chamber 44 against the flow pressure of the incoming water stream 14.

Figure 8:
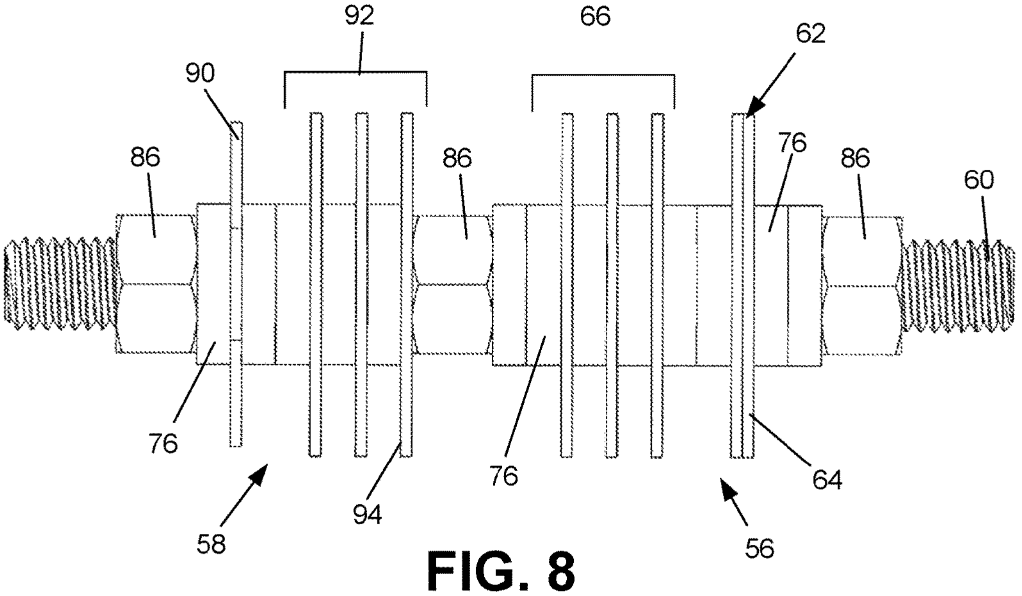
FIG. 8 is a side view of the internal assembly of the nanobubble generation device of FIG. 7.
Figure 9:
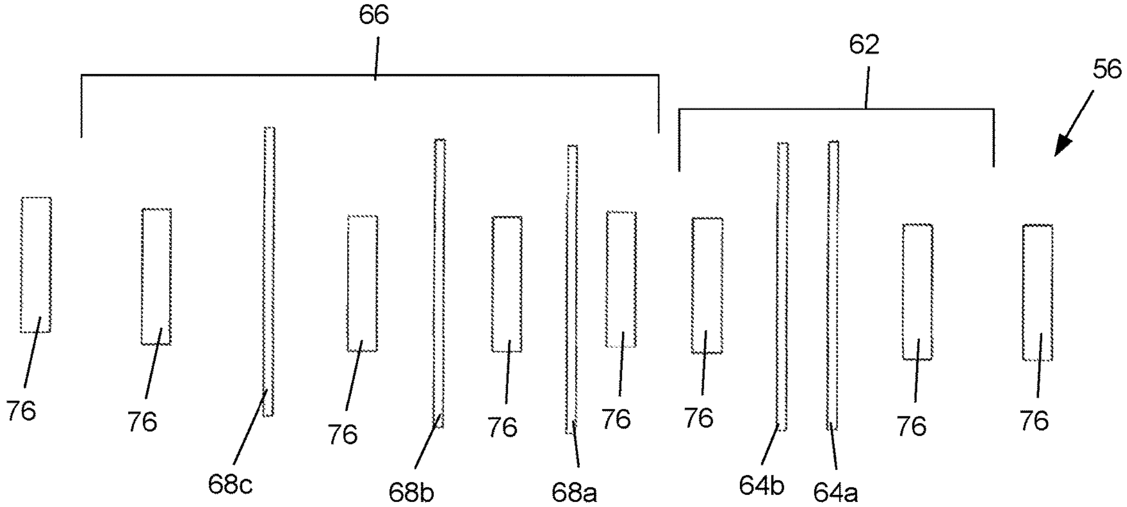
FIG. 9 is an exploded left side view of the first or inlet plate assembly of the nanobubble generation device of FIG. 8.
Figure 10:
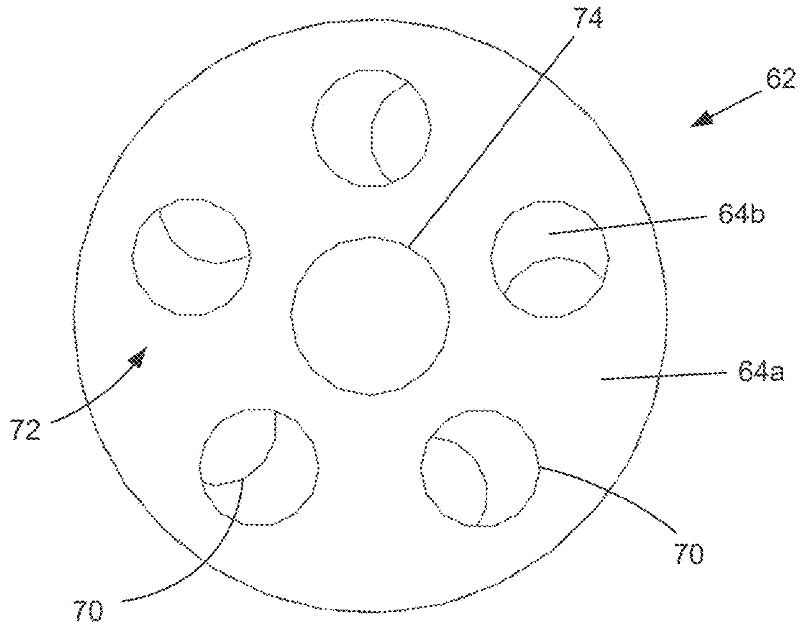
FIG. 10 is a front view of the inlet plates of the first/inlet plate assembly of FIG. 9.
Figure 11:
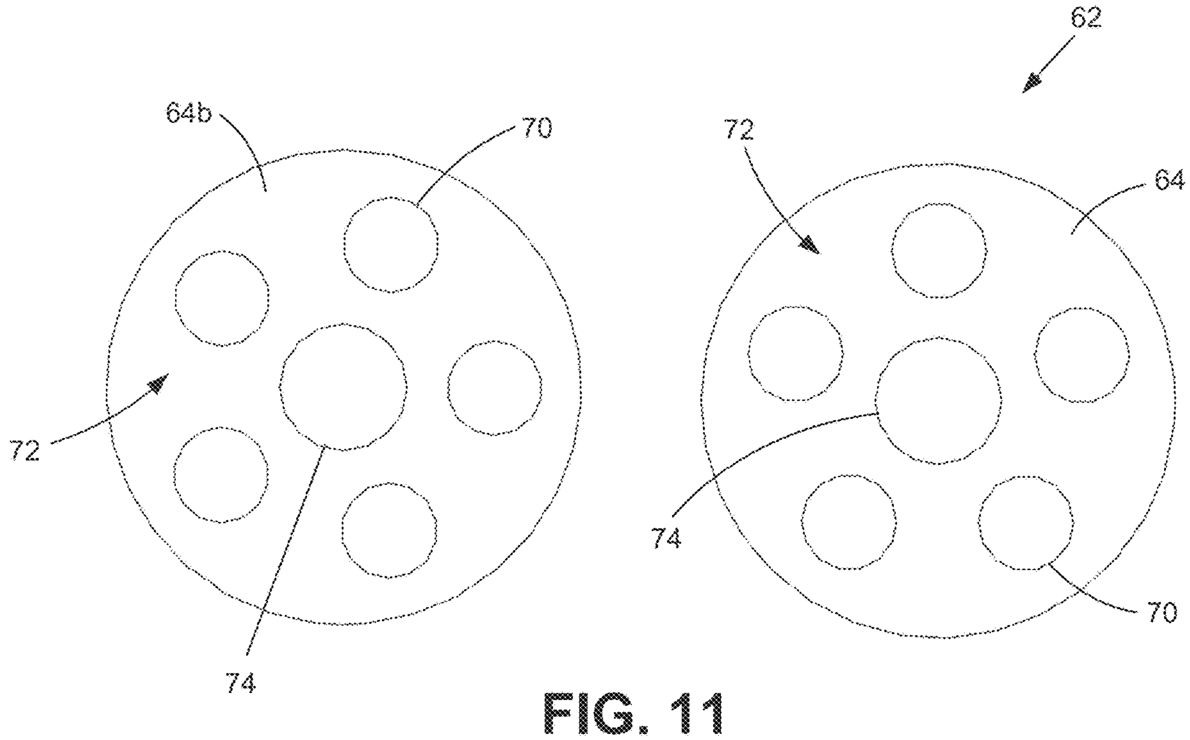
FIG. 11 is a front view of the two inlet plates of FIG. 10 shown separated from each other.
Figure 12:
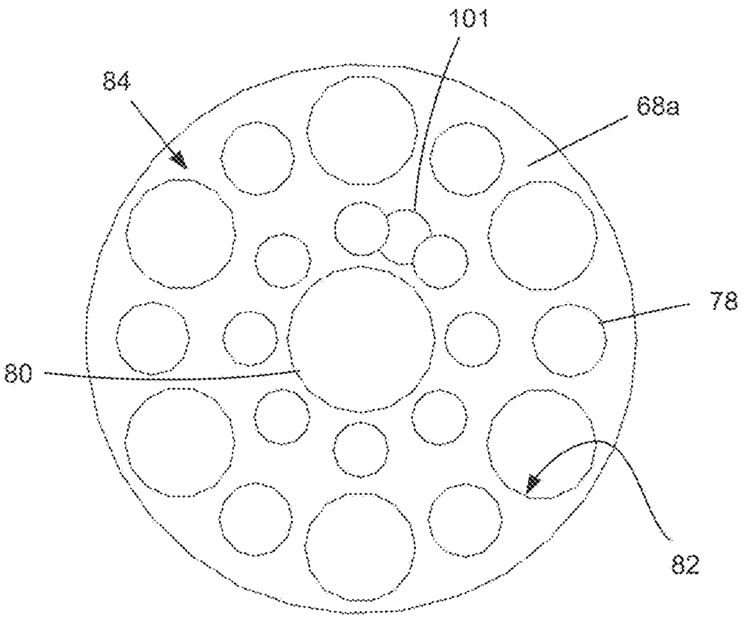
FIG. 12 is a front view of the first shear plate of the first/inlet plate assembly of FIG. 9.
Figure 13:
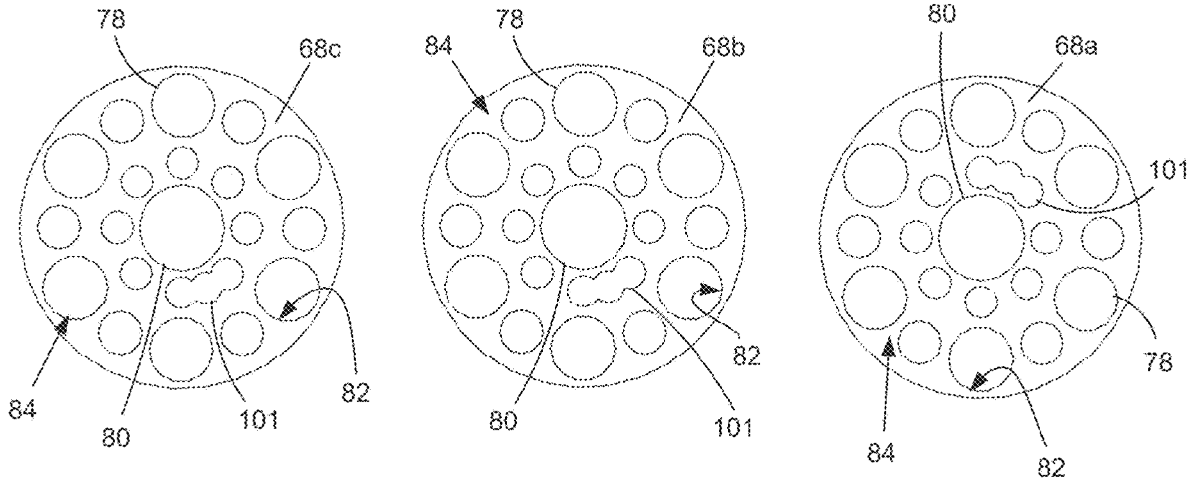
FIG. 13 is a front view of the three shear plates of the first/inlet plate assembly of FIG. 9 shown separate from each other.

The leading plate assembly 56 comprises an inlet gasket assembly 62 having one or more inlet gaskets 64 and an inlet shear plate assembly 66 having one or more, preferably a plurality of, shear inducing plates 68, as best shown in FIGS. 8-9. In the embodiment shown in the FIGS. 1-15, the device 10 has two inlet gaskets, shown as first inlet gasket **64*a* and second inlet gasket 64*b*. Each of the inlet gaskets 64 have a plurality of inlet apertures 70 that form an inlet aperture pattern 72, as best shown in FIGS. 10-11, that is selected to increase the velocity of the incoming water stream 14 and provide a pressure drop. In one embodiment, the inlet aperture pattern 72 of the first inlet gasket 64*a* is the same as the inlet gasket pattern 72 of the second inlet gasket 64*b*. However, to further increase the velocity and pressure drop, the second inlet gasket 64*b* is rotated relative to the first inlet gasket 64*a* such that the inlet aperture pattern 72 of the two inlet gaskets 64*a*/64*b* are not aligned, as best shown in FIG. 10. As noted above, the pressure drop allows for the entrained gas 16 to be released out of the liquid and form into macro, micro, and nanobubbles. As also shown in FIGS. 10-11, the inlet gaskets 64*a*/64*b* also have a centrally disposed mounting aperture 74 that allows the gaskets 64*a*/64*b* to be placed on the shaft 60, as shown in FIG. 8. A pair of spacers 76 are positioned on either side of the inlet gasket assembly 62, as shown in FIGS. 8-9, to space apart the inlet gasket assembly 62 from other components of the leading plate assembly 56. The spacers 76 may be nylon washers or the like. As noted below, other spacers 76 are used elsewhere in the internal assembly 32** between various components thereof.

Each of the shear inducing plates 68, shown as first shear plate **68*a*, second shear plate 68*b* and third shear plate 68*c*, of the inlet shear plate assembly 66 of the leading plate assembly 56 have a plurality of shearing apertures 78 that facilitate shearing and mixing of the incoming water stream 14, as best shown in FIGS. 5-6 and 12-13. The shear inducing plates 68*a*/68*b*/68*c* are incrementally spaced from one another and coaxially supported by the shaft 60 using a centrally disposed mounting aperture 80. The edges 82 of the shearing apertures 78 of the shear inducing plates 68 supply a cutting edge that aid in reducing macrobubbles and microbubbles into nanobubbles 20 as the fluid from the incoming water steam 14 passes through the new device 10 of the present invention. Additionally, the shear inducing plates 68 act to direct flow into a "torturous" or "snaking" path, forming a tortuous flow through the inlet shear plate assembly 66, which tortuous flow serves two purposes. First, directing the fluid flow into this path ensures that the bubbles formed in the cavitation zone are most likely to encounter the cutting edges 82 of the shear inducing plates 68. Second, the directing action encourages vigorous mixing of the fluid so that bubble collision and collapse will occur, also assisting in the formation of nanobubbles 20. As shown in the figures, the inlet shear plate assembly 66 of the leading plate assembly 56 is comprised of at least three shear inducing plates 68, however, no upper limit has been identified. In practicality, the limit on the number of shear inducing plates 68 is a decision which is based on marginal utility. Currently, all shear inducing plates *68a*/*68b*/*68c* in the inlet shear plate assembly 66 of the leading plate assembly 56 are of the same aperture pattern 84, with the shear inducing plates 68 being rotated axially in relation to one another to ensure the creation of the torturous flow through the inlet shear plate assembly 66. A pair of spacers 76 are positioned on either side of the inlet shear plate assembly 66 and between each of the shear inducing plates 68, as best shown in FIGS. 8-9, to space apart the inlet shear plate assembly 66 from other components of the leading plate assembly 56 and from adjacent shearing inducing plates 68. As noted above, the spacers 76 may be nylon washers or the like. Other spacers 76 are used elsewhere in the internal assembly 32** between various components thereof.

As shown in FIGS. 3-4 and 7-8, the leading plate assembly 56 is mounted on the shaft 60 with a connector 86, such as the threaded nut that is shown threaded onto the threaded shaft 60, on both the inlet side and the outlet side of the leading plate assembly 56 so as to straddle the leading plate assembly 56, as best shown in FIG. 8. The spacing between each shear inducing plate 68 is determined by placement of the spacers 76 between each of the shear inducing plates 68 and then compressed and held in place by a pair of nuts or other connectors 86 on the threaded ends of the central shaft 60. When the leading plate assembly 56 is compressed, as a result of tightening of the end nuts or other connectors 86, the inlet gaskets ***64a*/*64b* compress. This compression increases the outside diameter of the malleable gaskets 64 so the diameter thereof will be greater than the outside diameter of the shear inducing plates 68. When the stack tightening (e.g., the compression of the leading plate assembly 56) occurs after the leading plate assembly 56 is inserted into the center section chamber 44 of the center housing section 38, the inlet gaskets *64a*/*64b* will compress into an abutting engagement with the inner sidewall 88 of the center housing section 38, as best shown in FIG. 3. The compression of the inlet gaskets *64a*/*64b* and the resulting engagement with the inner sidewall 88 will assist in holding the entire internal assembly 32 stationary within the housing 22**.

Figure 14:
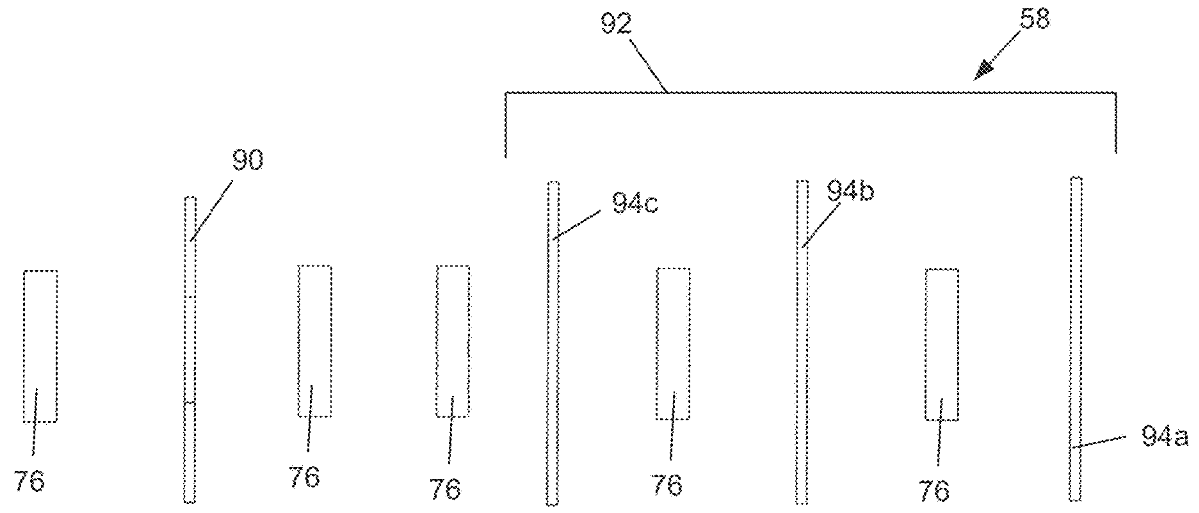
FIG. 14 is an exploded left side view of the second or outlet plate assembly of FIG. 8, with the shear plates being the same as that shown in FIGS. 12 and 13.
Figure 15:
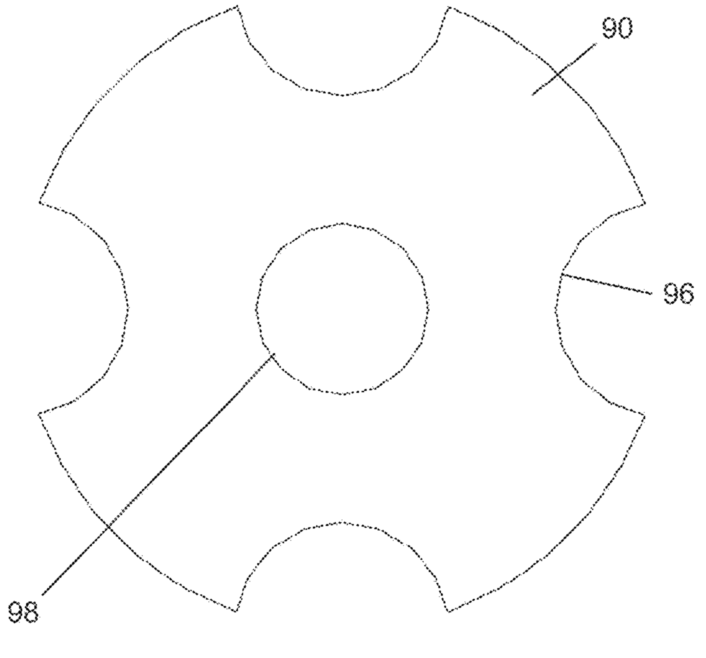
FIG. 15 is a front view of the outlet plate of the second/outlet plate assembly of FIG. 14.

As noted above, the internal assembly 32 also has a trailing plate assembly 58 that is located downstream of the leading plate assembly 56, as shown in FIGS. 3-8. The trailing plate assembly 58 comprises an outlet gasket 90 and an outlet shear plate assembly 92. The outlet shear plate assembly 92 has one or more, preferably a plurality of, shear inducing plates 94, as best shown in FIGS. 8 and 14. The outlet gasket 90 has a plurality of relatively large outlet apertures 96, as shown in FIG. 15, that allow the fluid to flow toward the outlet 28 while further increasing the velocity and providing a pressure drop. As also shown in FIG. 15, the outlet gasket 90 also has a centrally disposed mounting aperture 98 that allows the gasket 90 to be placed on the shaft 60, as shown in FIG. 8. A pair of spacers 76 are positioned on either side of the outlet gasket 58, as shown in FIGS. 8 and 14, to space apart the outlet gasket 90 from other components of the trailing plate assembly 58. The spacers 76 may be nylon washers or the like. As noted below, other spacers 76 are used elsewhere in the internal assembly 32 between various components thereof.

Figure 5:
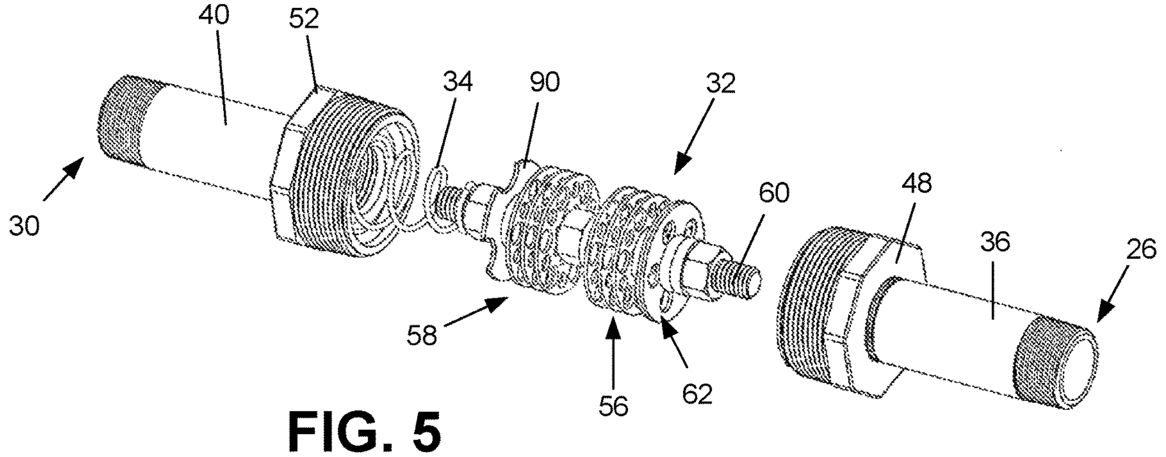
FIG. 5 is a front perspective view of the nanobubble generation device of FIG. 4.
Figure 6:
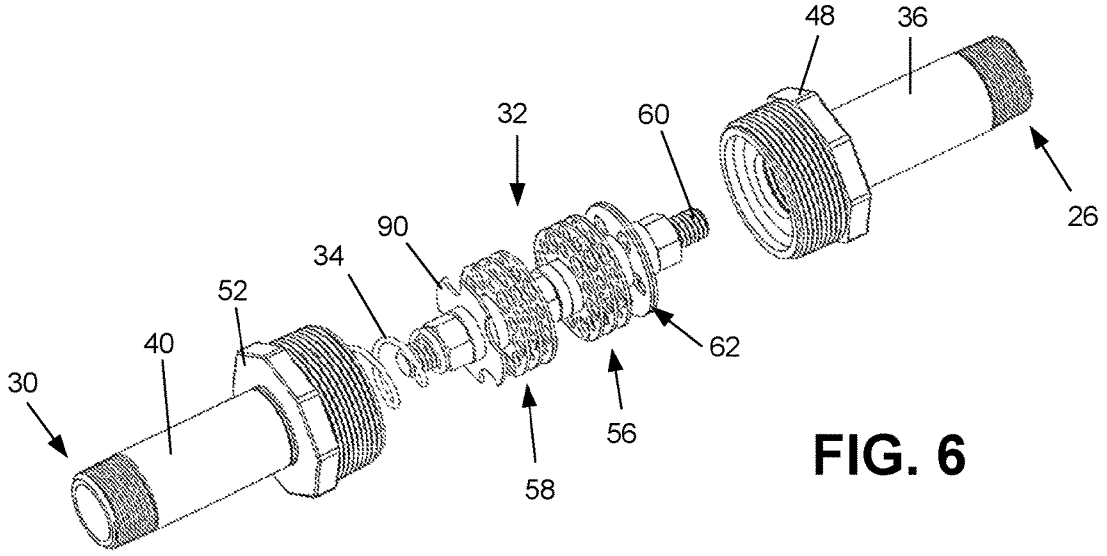
FIG. 6 is a back perspective view of the nanobubble generation device of FIG. 4.
Figure 7:
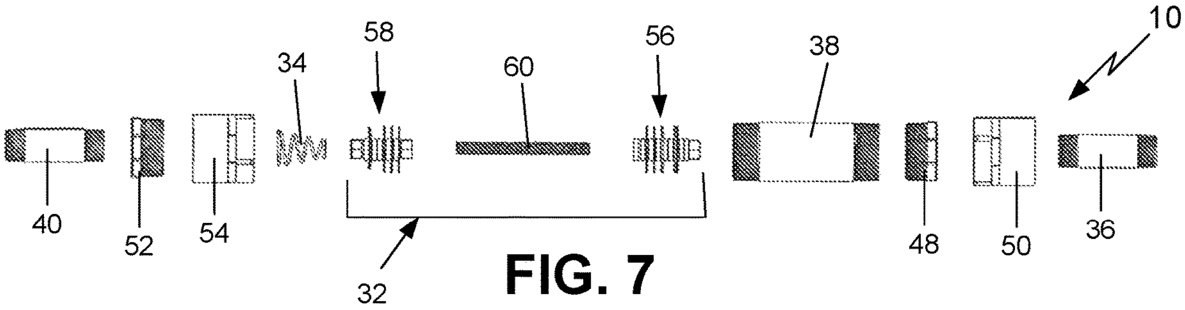
FIG. 7 is an exploded side view of the nanobubble generation device of FIG. 2.

Each of the shear inducing plates 94, shown as first shear plate *94a*, second shear plate *94b* and third shear plate *94c*, of the trailing plate assembly 58 have a plurality of shearing apertures 78 that facilitate shearing and mixing of the incoming water stream 14, as best shown in FIGS. 5-6. The shear inducing plates ***94a*/*94b*/*948c* are configured as described above for the shear inducing plates 68 of the leading plate assembly 56 (which discussion is incorporated herein as though fully set forth herein) are incrementally spaced from one another and coaxially supported by the shaft 60 using a centrally disposed mounting aperture 80. The edges 82 of the shearing apertures 78 of the shear inducing plates 94 supply a cutting edge that aid in reducing macrobubbles and microbubbles into nanobubbles 20 as the fluid passes through the new device 10 of the present invention. Additionally, the shear inducing plates 94 act to direct flow into a "torturous" or "snaking" path, forming a tortuous flow through the inlet shear plate assembly 92, which tortuous flow serves the two purposes described above for the inlet shear plate assembly 66. In one embodiment, the outlet shear plate assembly 92 of the trailing plate assembly 58 is comprised of at least three shear inducing plates *94a*/*94b*/*94c*, however, no upper limit has been identified. Each of the shear inducing plates *94a*/*94b*/*94c* in the outlet shear plate assembly 92 of the trailing plate assembly 58 are of the same aperture pattern. As with the inlet shear plate assembly 66, the shear inducing plates 94 of the outlet shear plate assembly 92 are rotated axially in relation to one another to ensure the creation of the torturous flow through the outlet shear plate assembly 92. A pair of spacers 76 are positioned on either side of the outlet shear plate assembly 92 and between each of the shear inducing plates 94, as best shown in FIGS. 8 and 14, to space apart the outlet shear plate assembly 92 from other components of trailing plate assembly 58 and from adjacent shearing inducing plates 94. As noted above, the spacers 76 may be nylon washers or the like. Other spacers 76 are used elsewhere in the internal assembly 32** between various components thereof.

As shown in FIGS. 3-4 and 7-8, the trailing plate assembly 58 is also mounted on the shaft 60 with a connector 86, such as the threaded nut that is shown threaded onto the threaded shaft 60, on both the inlet side and the outlet side of the trailing plate assembly 58 so as to straddle the trailing plate assembly 58, as best shown in FIG. 8. The spacing between each shear inducing plate 94 is determined by placement of the spacers 76 between each of the shear inducing plates 94 and then compressed and held in place by a pair of nuts or other connectors 86 on the threaded ends of the central shaft 60. When the trailing plate assembly 58 is compressed, as a result of tightening of the end nuts or other connectors 86, the outlet gasket 90 compress. This compression increases the outside diameter of the malleable gasket 90 so the diameter thereof will be greater than the outside diameter of the shear inducing plates 94. When the stack tightening (e.g., the compression of the trailing plate assembly 58) occurs after the trailing plate assembly 58 is inserted into the center section chamber 44 of the center housing section 38, the outlet gasket 90 will compress into an abutting engagement with the inner sidewall 88 of the center housing section 38, as best shown in FIG. 3. The compression of the outlet gasket 90 and the resulting engagement with the inner sidewall 88 will assist in holding the entire internal assembly 32 stationary within the housing 22.

In addition to the abutting engagement provided by the compressed inlet gaskets 64 and the outlet gasket 90 against the inner sidewall 88 of the center housing section 88, the internal assembly 32 is also supported downstream by the compression spring 34 that is positioned between the internal assembly 32 and the outlet pipe 40, typically at the outlet transitional connector 52 and/or the outlet fitting 54, as shown in FIG. 3. In one of the embodiments of the new device 10, a small, separate keying bar 100 is positioned through a keyed aperture 101 in the gaskets 64/90 and plates 68/94 to function as a key mechanism.

Figure 16:
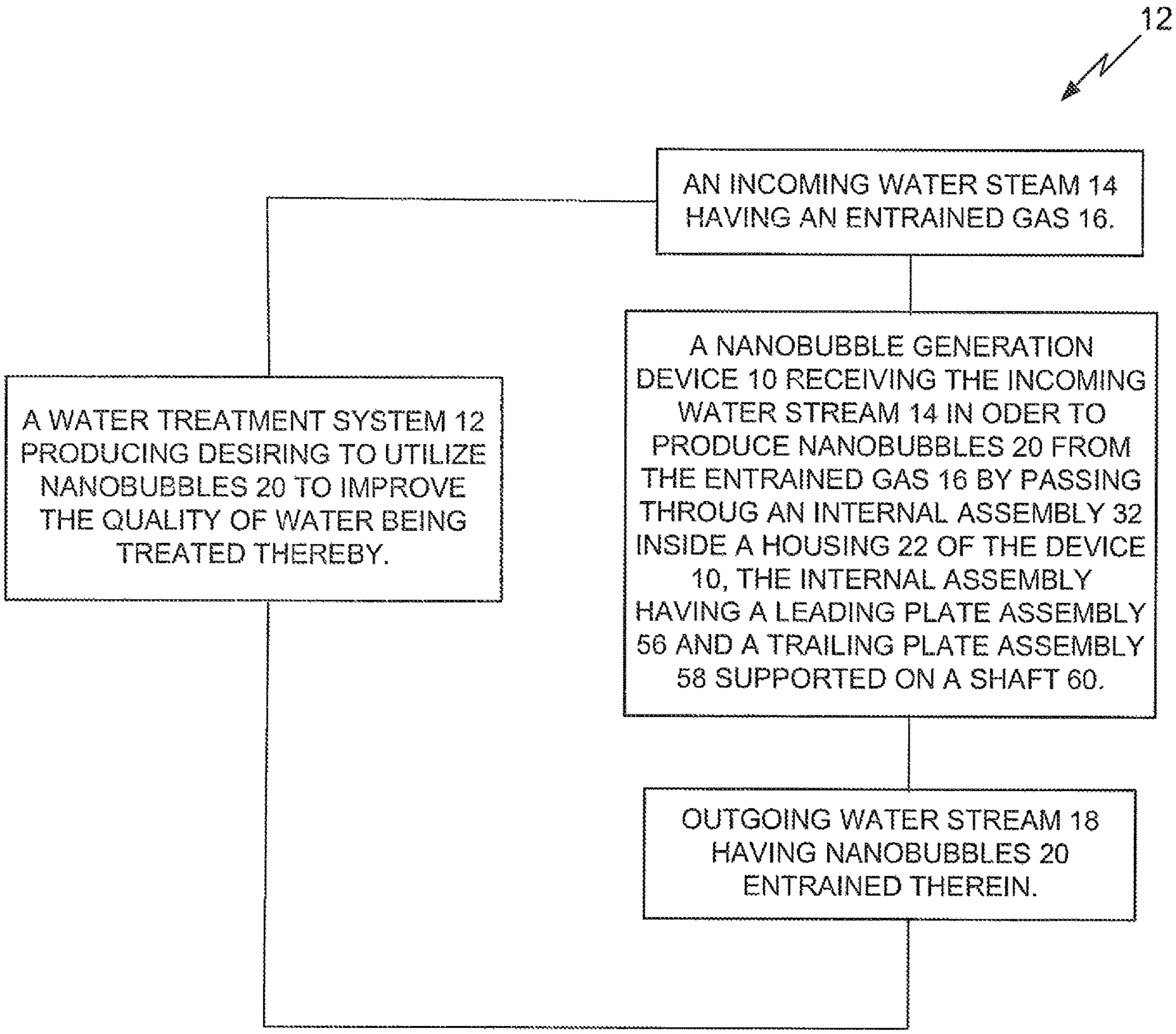
FIG. 16 is a chart showing a system for treating water to produce nanobubbles using the nanobubble generation device of FIG. 1 that is configured according to a preferred embodiment of the present invention.

A system 12 for utilizing the new nanobubble generation device 10, an embodiment of which is shown in FIG. 16, generally comprises a water treatment facility 102 that is utilized to treat water so as to improve the quality thereof and which desires to utilize nanobubbles 20 to achieve certain quality goals. An incoming water stream 14 is received into a nanobubble generation device 10 that is configured according to the present invention. As set forth above, the incoming water stream 14 having an entrained gas 16 is received into the inlet 24 of the housing 22 and flows through the housing 22 where it engages an internal assembly 32 that is structured and arranged to produce nanobubbles 20 and then is discharged as an outgoing water stream 18 having nanobubbles 20 entrained therein, as summarized in FIG. 16. The internal assembly 32 has a leading plate assembly 56 with an inlet gasket assembly 62 having one or more inlet gaskets 64 and an inlet shear plate assembly 66 with a plurality of shear inducing plates 68, a trailing plate assembly 58 with at least one outlet gasket 90 and an outlet shear plate assembly 92 having a plurality of shear inducing plates 94, and a shaft 60 that supports the two assemblies 56/58 inside the center section chamber 44 of the center housing section 38 of the housing 22, as shown in the figures and set forth above.

Figure 17:
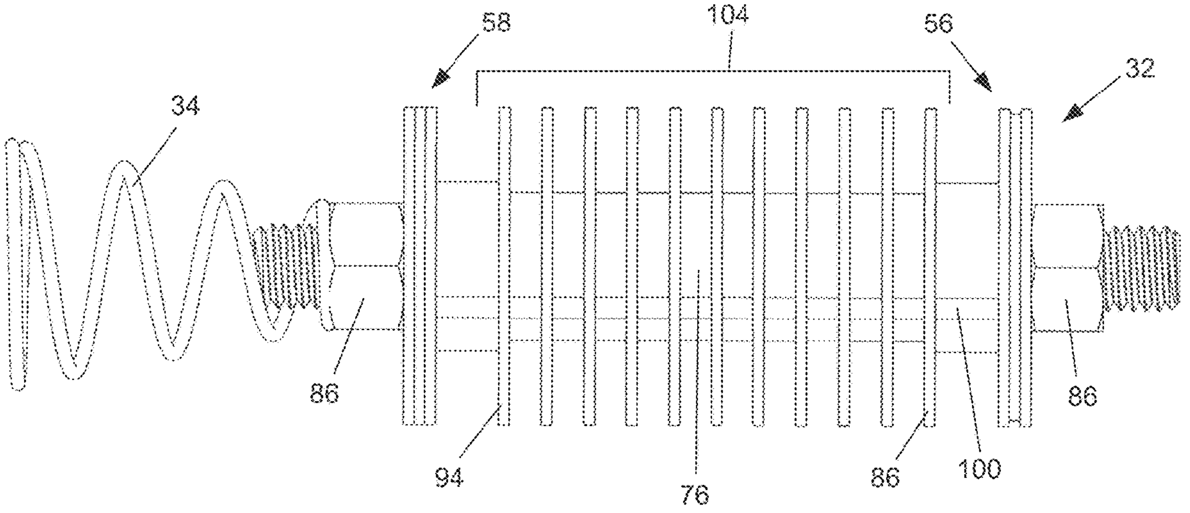
FIG. 17 is a left side view of the internal assembly and spring of a nanobubble generation device that is configured according to a second embodiment of the present invention.
Figure 18:
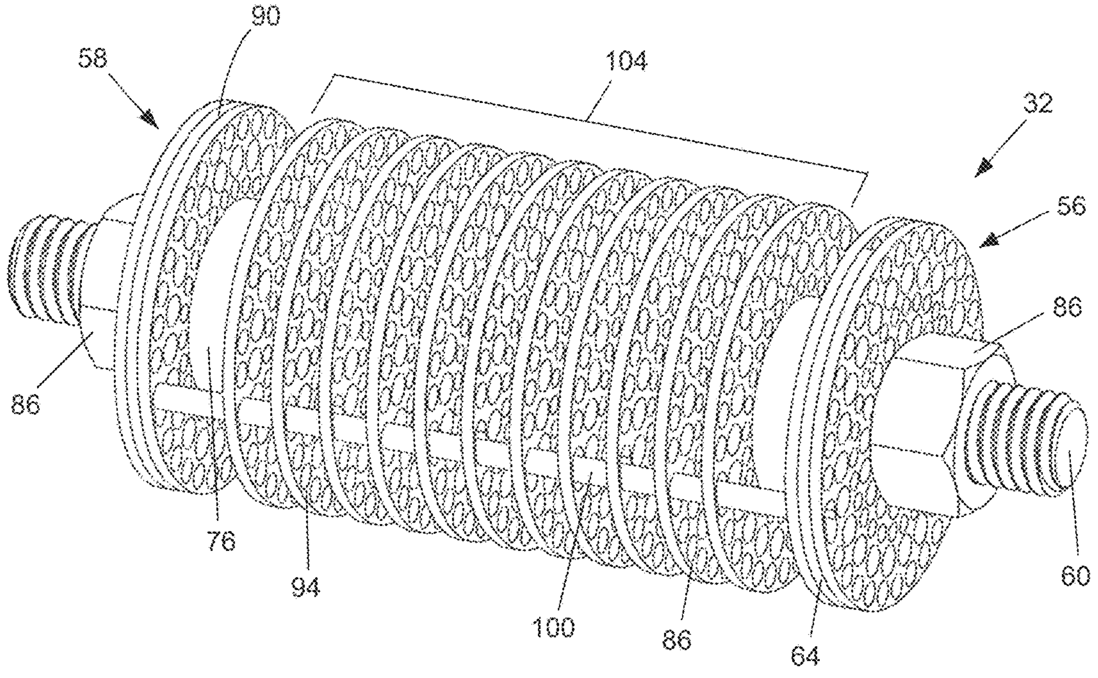
FIG. 18 is a left side perspective view of a nanobubble generation device of FIG. 17, shown without the spring.
Figure 19:
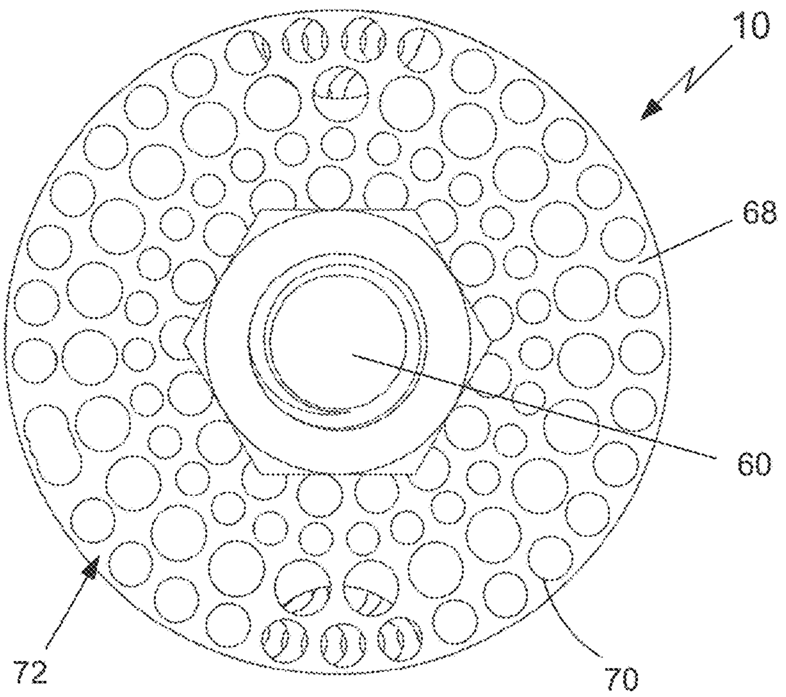
FIG. 19 is a front view of the internal assembly of the nanobubble generation device of FIG. 17, shown without the support rod.

An alternative embodiment of the new nanobubble generation device 10 of the present invention is shown in FIGS. 17-24. In one configuration of this second embodiment, the device 10 utilizes the same housing 22 as described above, with a center housing section 38 having a center section chamber 44 in which the internal assembly 32 is positioned. The internal assembly 32 of this embodiment, which is shown in FIGS. 17-19, comprises a leading plate assembly 56 and a trailing plate assembly 58 that have their shear plate assemblies 66/92 combined, which combination is hereinafter referred to jointly as a shear plate assembly 104. The leading plate assembly 56 of this embodiment comprises a single inlet gasket 64 positioned between two shear inducing plates 68, as best shown in FIGS. 17-18. As described above, the leading plate assembly 56 is the first portion of the internal assembly 32 that the fluid flow of the incoming water stream 14 would pass through after entering the housing 22 of device 10 and being reduced by the transition from the inlet pipe 36 to the center housing section 38. Downstream of the leading plate assembly 56, a spacer 76 separates the leading plate assembly from the first shear inducing plate 68 of the shear plate assembly 104. As best shown in FIGS. 17-8, a plurality of shear inducing plates 68 (or 94), each being separated by additional spacers 76, are positioned downstream of the leading plate assembly 56. As described above, each shear inducing plate 68 is keyed, containing a specifically shaped key aperture 101, to receive a keying rod 100 which serves to hold each shear plate 68 at a desired position in relation to adjacent shear plates 68. A plurality of shear plates 68, each separated from each other by spacers 76, is then proceeded by a trailing spacer 76 and then a trailing plate assembly 58. The trailing plate assembly 58 also consists of a trailing flow restricting outlet gasket 90 between two identical outlet shear inducing plates 94. All of the gaskets 64/90, shear inducing plates 68/94 and spacers 76 are coaxially supported on a centrally disposed threaded shaft 60 and, as described above, are compressed and secured between and with connectors 86. In this embodiment, there is a connector (nut) 86 on the shaft 60 toward the inlet 24 and toward the outlet 28. When fully assembled, the compression spring 34, as set forth above, is positioned between the outlet transitional connector 52 and/or the outlet fitting 54 and the back end of the trailing plate assembly 58.

The leading 56 and trailing 58 plate assemblies, comprising a flow restricting gasket 64/90 secured between two shear inducing plates 68/94, serves the purpose to not only regulate pressure drops within and across the entire internal assembly 32 but also to secure the internal assembly 32 within the center housing section 38 of the housing 22. When the inlet disposed nut 86 and the outlet disposed nut 86 are tightened, the entire internal assembly 32 is secured in the housing 22. As described above, the compression caused by tightening the nuts 86 at both ends of the internal assembly 32 compresses the flow restricting gaskets 64/90 such that the outside diameter of the gaskets 64/90 extends beyond the outside diameter of the shear inducing plates 68/94 and against inner sidewall 88 center housing section 38), thereby securing the entire internal assembly 32 in the housing 22 of the new device 10.

Figure 20:
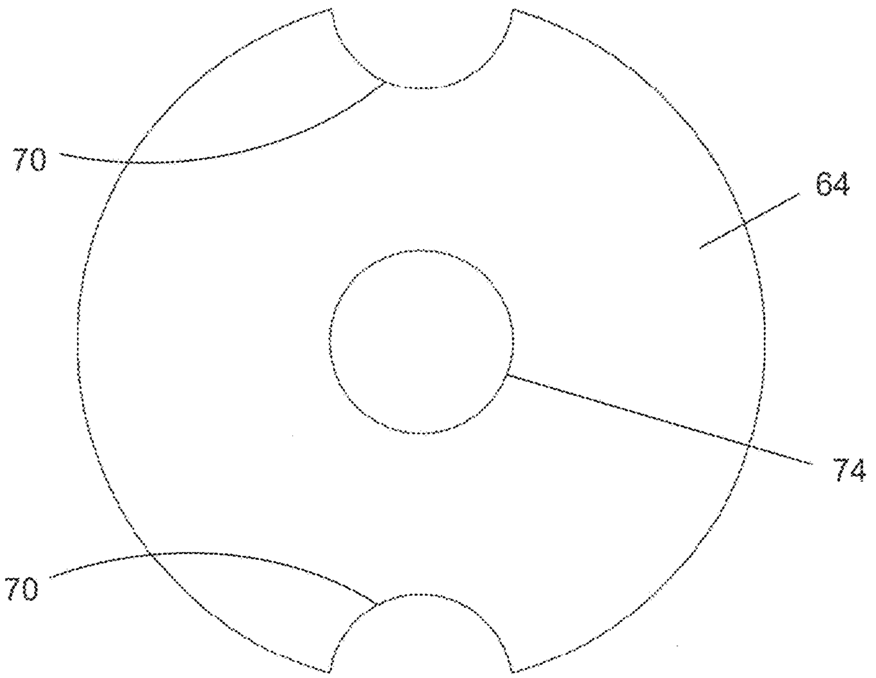
FIG. 20 is a front view of the inlet plate of the nanobubble generation device of FIG. 17, shown without the support rod.

FIG. 20 is an illustration of an example inlet gasket 64 that would be secured between the two shear inducing plates 68 of the leading plate assembly 56. This gasket 64 has an aperture pattern 72 would only allow fluid flow through the outer apertures 70 of the inlet gasket 64 and the inner sidewall 88 of the central housing section 38. The center mounting aperture 74 would receive the centrally disposed support shaft 60. The flow of the incoming water stream 14 into the device 10 is then restricted by the first two perforated shear inducing plates 68, which surround the flow restricting inlet gasket 64. As described above, by restricting the flow downstream while expanding the line diameter, a turbulent mixing zone is created within the housing 22. As the fluid is channeled through the flow restricting assembly gasket 64, situated between the first two shear inducing plates 68, velocity is increased and a pressure drop is experienced. The pressure drop allows for the dissolved entrained gases 16 (e.g., air, oxygen, or otherwise as may be utilized) in the incoming water stream 14 to be released out of the liquid and form into macro, micro, and nanobubbles 20. The degree to which the flow is restricted by the flow restricting gasket impacts both the pressure drop across the gasket as well as the quantity and size of the resulting entrained gas within the liquid downstream of the pressure drop. Since an increase in differential pressure requires an increase in energy, the open area of the gasket 64 and the shear inducing plates 68, is determined by the benefit achieved by having more entrained gases in comparison with the cost required to achieve the necessary pressure drop.

Figure 21:
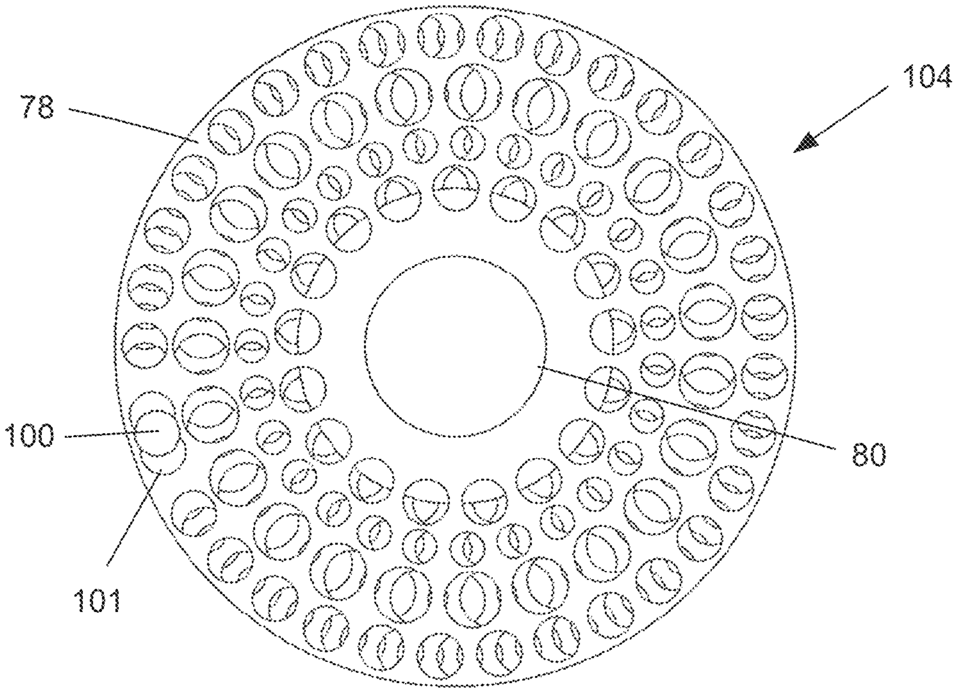
FIG. 21 is a front view of the shear plate assembly and support rod of the nanobubble generation device of FIG. 17.
Figure 22:
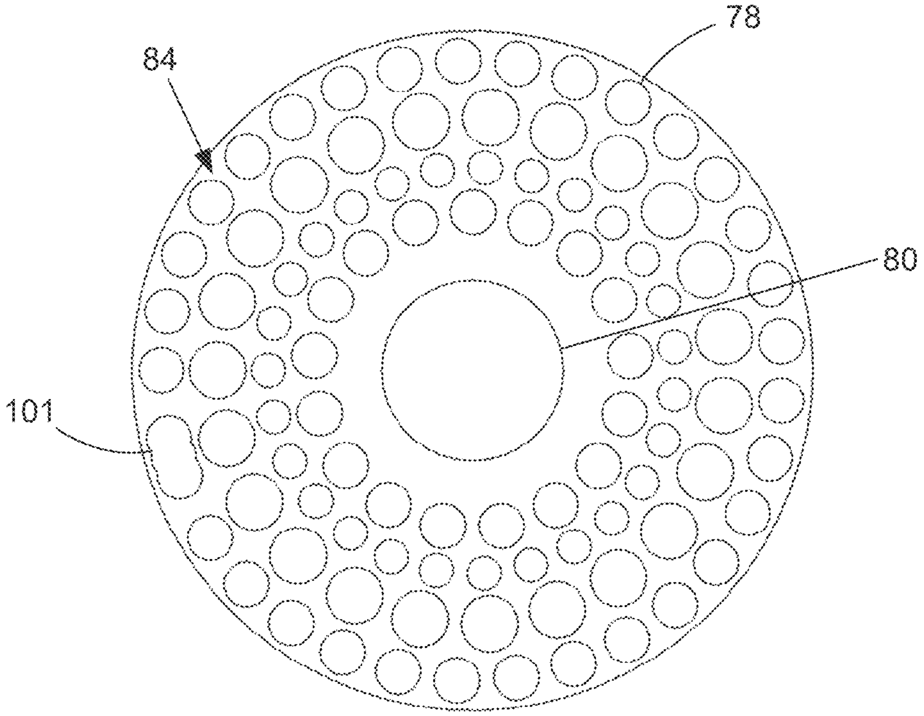
FIG. 22 is a front view of the first shear plate of the shear plate assembly of FIG. 21, shown without the support rod.
Figure 23:
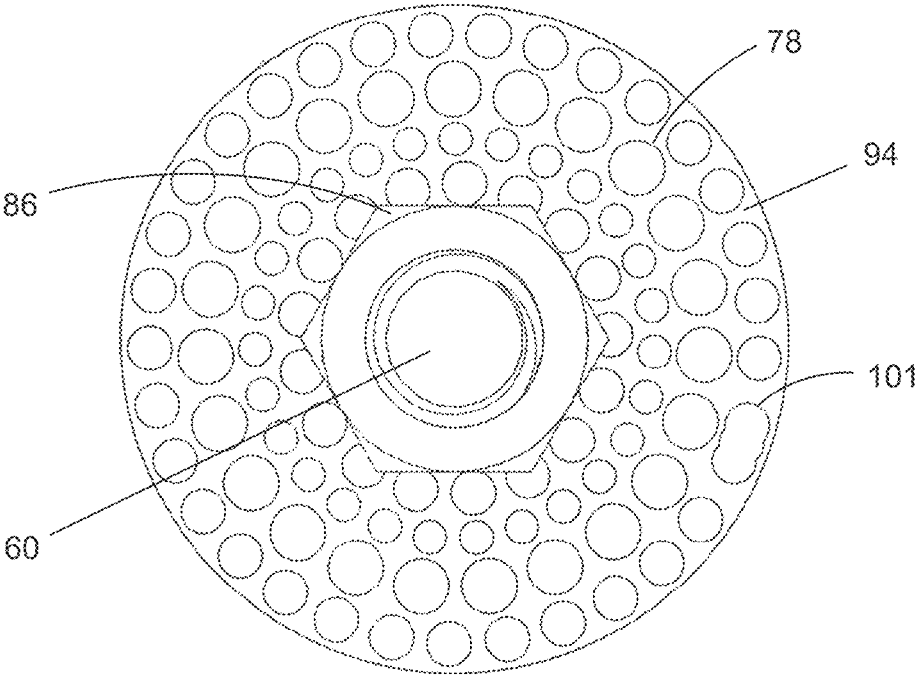
FIG. 23 is a back view of the shear plate assembly of the nanobubble generation device of FIG. 17; shown without the support rod.
Figure 24:
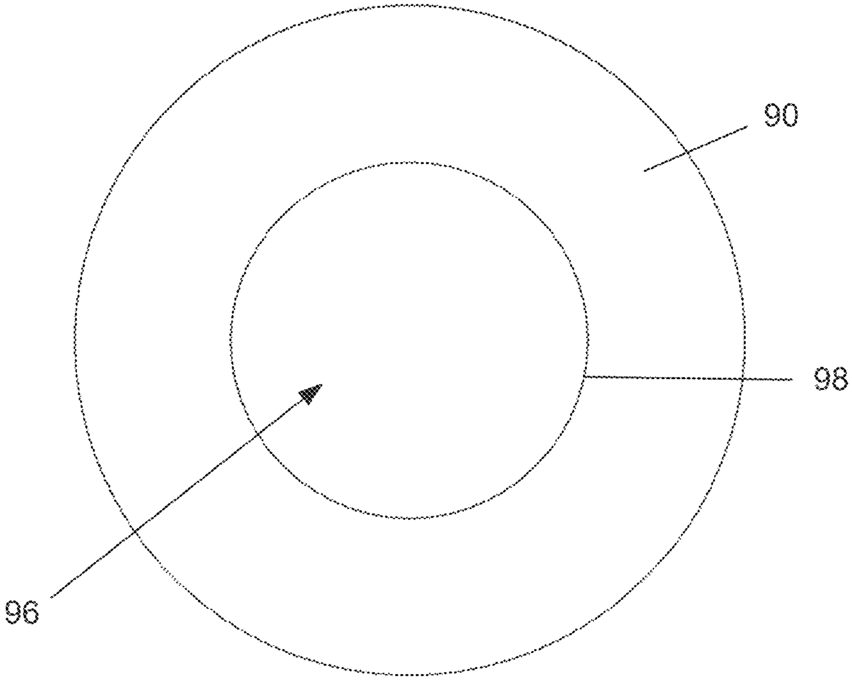
FIG. 24 is a front view of the outlet plate of the internal assembly of the nanobubble generation device of FIG. 17.

FIGS. 21-23 are front view of example shear inducing plates 68/94 that form the shear plate assembly 104, each having an aperture pattern 84 In a preferred embodiment, all of the shear inducing plates 68/94 utilize the same aperture pattern 84. The shearing plates 68/94 comprise of a central mounting aperture 80 sized to receive the central support shaft 60, a plurality of shear inducing apertures 78 of various sizes, and a key aperture 101 designed to receive the keying rod 100 that serves as a key for the shear inducing plates 68/94. In the embodiment shown in the figures, the shearing apertures 78 are circular and prevalent throughout the shear inducing plates 68/94. The key aperture 101 is configured to receive a round bar stock keying rod 100 serving as a key, allowing for the shear inducing plates 68/94 to be positioned such that subsequent plates 68/94 are axially rotated in relation to the central mounting aperture 80. In this fashion, the aperture patterns 84 of the shear inducing plates 68/94 which are immediately adjacent to each other do not align. With this key aperture 101 the shear inducing plates 68/94 can be placed in three different orientations, axially. Use of this aperture pattern 84 for the shear inducing plates 68/94 of the leading 56 and trailing 58 plate assemblies ignores the key aperture 101 as the flow restricting gaskets 64/90 will be arranged so as to cover the key aperture 101 and the keying rod 100 will be cut to length to reside between leading 56 and trailing 58 plate assemblies.

FIG. 19 is an illustration of three shear inducing plates 68/94 stacked on top of each other and axially rotated to one of each of the three positions that is allowed by the key aperture 101. This demonstrates how the aperture patterns 84 vary from one to the next due to the rotation of the shear inducing plates 68/94. In this way, as described above, a torturous path through the internal assembly 32 is created.

As set forth above, the trailing plate assembly 58 comprises two coaxially supported shear inducing plates 94 with an flow restricting outlet gasket 90 placed between the two plates 94. This flow restricting outlet gasket 90 is of a different pattern than the inlet gasket 64 used between the first two shear inducing plates 68. This trailing plate assembly 58 is utilized to supply back pressure to the entire device 10, setting systems linear velocity, and thus helping to produce the pressure drop across the leading plate assembly 56 having the first two shear inducing plates 68. The trailing plate assembly 58 also serves to channel the fluid flow out of the housing 22.

As will be readily understood by persons who are skilled in the art, the new nanobubble generation device 10 of the present invention comprises an internal assembly 32 having multiple shear inducing plates 68/94 that are formed into at least three different plate assemblies, namely, the following: (1) a leading, pressure drop inducing first plate assembly 56; (2) a plurality of identical or nearly identical shearing/mixing plates 68/94 of the shear plate assembly 10 that are mounted on, in an axially rotated pattern, a central support shaft 60 running the length of the internal assembly 32; and (3) a trailing plate assembly 58 that controls line velocity and overall system pressure differential.

The leading 56 and trailing 58 flow directing plate assemblies in the current configuration comprises a gasket 64/90 compressed between two identical plates of the same aperture pattern 84 as the shear inducing plates 68/94. The gaskets contains apertures 70/96 to restrict flow as necessary for the inlet 24 and outlet 28 design requirements, and are sized to space the shear inducing plates 68/94 apart the width of the gasket 64/90. When the plate assemblies 56/58 are compressed, as a result of tightening of the end nuts or other connectors 86, the gaskets 64/90 between the shear inducing plates 68/94 compress. As set forth above, this compression increases the outside diameter of the malleable gaskets 64/90 so they will be greater than the outside diameter of the shear inducing plates 68/94. If the stack tightening (e.g., the compression of the plate assemblies 56/58) occurs after the plate assemblies 56/58 are inserted into the housing 22, the gaskets 64/90 will compress against the inner sidewall 88 of the center housing section 38, thus assisting in holding the entire internal assembly 32 stationary within the housing 22. The internal assembly 32 is also supported downstream by a spring 34. Any movement of the internal assembly 32 would only happen if the force of the water/liquid in the line overcame the force supplied by the compression of the gaskets 64/90 against the inner sidewall 88 of the center housing section 38 and the spring tension of the compression spring 34.

In one of the preferred embodiments of the present invention, the housing 22 is made from stainless steel, PVC or CPVC, the shear inducing plates 68/94 are made from stainless steel (such as 304, 316 or 316L stainless steel), the gaskets 64/90 are made from EDPM, rubber, nitrile or the like, and the spacers 76 are made from nylon, UHMW or the like. However, these materials are only presented as exemplary materials, the present invention is not limited to these materials. Likewise, the present invention is not limited to use with only water. Instead, a wide variety of liquids having a wide variety of entrained gases can be utilized with the new device 10.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there may be numerous components of the embodiments described herein that can be readily replaced with equivalent functioning components to accomplish the objectives and obtain the desired aspects of the present invention. The various embodiments set forth herein are intended to explain the best mode of making and using the present invention as currently known to and appreciated by the present inventor(s) and to enable other persons who are skilled in the relevant art to make and utilize the present invention. Although, the described embodiments may comprise different features, not all of these features are required in all embodiments of the present invention. More specifically, as will be readily appreciated by persons who are skilled in the art, certain embodiments of the present invention only utilize some of the features and/or combinations of features disclosed herein.

What is claimed is:

1. A nanobubble generation device, comprising:

a housing having an inlet at a first end, an outlet at a second end and a center housing section disposed between said inlet and said outlet, said center housing section having an inner sidewall and a center section diameter, a direction of fluid flow being from said first end to said second end;

an inlet pipe at said first end of said housing upstream of said center housing section, said inlet pipe having an inlet pipe diameter less than said center section diameter of said center section;

an outlet pipe at said second end of said housing downstream of said center housing section, said outlet pipe having an outlet pipe diameter less than said center section diameter of said center section; and an internal assembly disposed in said center housing section, said internal assembly having a leading plate assembly positioned toward said inlet, a trailing plate assembly positioned toward said outlet and a shaft supporting said leading plate assembly and said trailing plate assembly in said center housing section, said leading plate assembly having a compressible inlet gasket positioned toward said inlet and a plurality of shear inducing plates positioned downstream of said inlet gasket, said inlet gasket having a plurality of inlet apertures disposed in an inlet aperture pattern, said trailing plate assembly having an outlet gasket positioned toward said outlet and a plurality of shear inducing plates positioned upstream of said outlet gasket, said outlet gasket having a plurality of outlet apertures disposed in an outlet pattern, each of said shear inducing plates of said leading plate assembly and said trailing plate assembly having a plurality of shearing apertures disposed in an aperture pattern, each of said shear inducing plates positioned on said shaft in spaced apart relation to an adjacent shear inducing plate with said aperture pattern of said adjacent shear inducing plate being offset so said shearing apertures of said adjacent shear inducing plates are not in alignment with each other, wherein when an incoming fluid stream having an entrained gas flow through said center housing section in said direction of fluid flow, the incoming fluid stream will contact said leading plate assembly and said trailing plate assembly in a manner so as to flow through said inlet apertures, said shearing apertures and said outlet apertures to cavitate, mix and/or shear the entrained gas to form nanobubbles in the incoming fluid stream and produce an outgoing fluid stream having the nanobubbles entrained therein.

2. The device of claim 1, wherein each of said inlet gasket and said outlet gasket are sized and configured to abuttingly engage said inner sidewall of said center housing section to hold said internal assembly in position in said center housing section.

3. The device of claim 2 further comprising connectors on said shaft toward said inlet and said outlet, wherein said inlet gasket and said outlet gasket expand upon compression thereof due to connectors toward said inlet and said outlet being tightened on said shaft.

4. The device of claim 1 further comprising a spacer between each adjacent shear inducing plates to hold said adjacent shear inducing plates in spaced apart relation to each other.

* * * * *